United States Patent

[11] 3,617,382

[72] Inventors Christos B. Natsis
 Lisle;
 John T. Horton, Chicago, both of Ill.
[21] Appl. No. 745,423
[22] Filed July 17, 1968
[45] Patented Nov. 2, 1971
[73] Assignees Christos B. Natsis
 Wilmette, ;
 John T. Horton
 Hinsdale, Ill.

[54] MIXING APPARATUS AS USED IN MASS AND HEAT TRANSFER PROCESSES
 21 Claims, 24 Drawing Figs.
[52] U.S. Cl. .................................................. 127/15,
 23/269, 23/273, 127/16, 127/58, 210/179, 259/8,
 259/108
[51] Int. Cl. .................................................. C13k 1/10,
 B01d 9/00, B01f 7/12
[50] Field of Search ........................................ 127/15–17,
 58, 60–62; 210/179, 285; 23/269, 270.5, 273;
 259/7, 8, 108

[56] References Cited
 UNITED STATES PATENTS
 1,845,128  2/1932  Coahran .................  23/269 X
 1,868,406  7/1932  Bonath ...................  127/15
 1,953,618  4/1934  Kramer ..................  23/270.5 X
 2,230,768  2/1941  Stuntz ....................  127/15
 2,995,612  8/1961  Hervert ..................  23/269 X
 2,601,674  6/1952  Reman ...................  259/7 X Primary Examiner—Morris O. Wolk
Assistant Examiner—D. G. Conlin
Attorney—Merriam, Marshall, Shapiro & Klose ABSTRACT: Mixing apparatus includes a bank of spaced parallel baffles, extending horizontally, vertically or at an angle, closure means providing with the baffles a tortuous flow path through the bank, and means mounting the baffles for relative rotation between adjacent baffles, the baffles including rib means projecting laterally from opposite sides thereof and extending transversely of the direction of relative rotation, and the rib means preferably projecting into close proximity to rib means of adjacent baffles, whereby relative rotation produces alternate shearing and mixing of portions of a fluid contained between adjacent baffles. The horizontally extending baffles comprise alternate disc members and annular members. The vertically extending baffles comprise vertically coaxial cylindrical ring members. The baffles at an angle can comprise a series of vertical coaxial ring members positioned conically, or they can be curved configurations. The rib means may comprise conduit means for circulating a heat transfer fluid through the baffles. The apparatus may be adapted as a crystallizer by providing fluid inlet and outlet means at opposite ends of the flow path, and recycle conduit means interconnecting the inlet and outlet means.

A continuous process for crystallizing a substance from a viscous solution comprises conducting the solution in a tortuous flow path through the mixing apparatus, producing relative rotation between adjacent baffles, cooling the solution in the flow path, and cycling a product crystal slurry from a downstream location to an upstream location in the flow path. The crystallization process may be employed for crystallizing dextrose from aqueous solution.

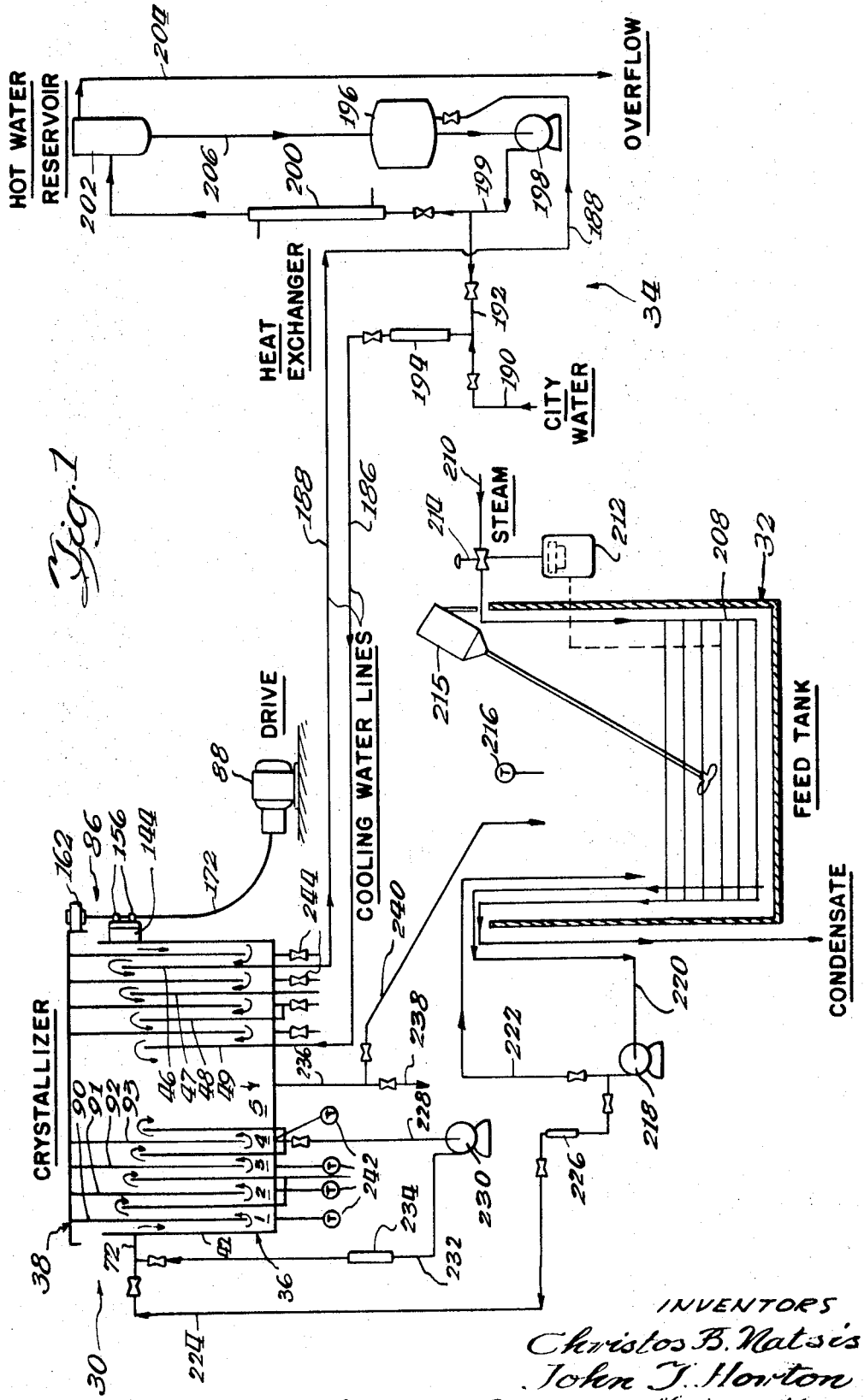

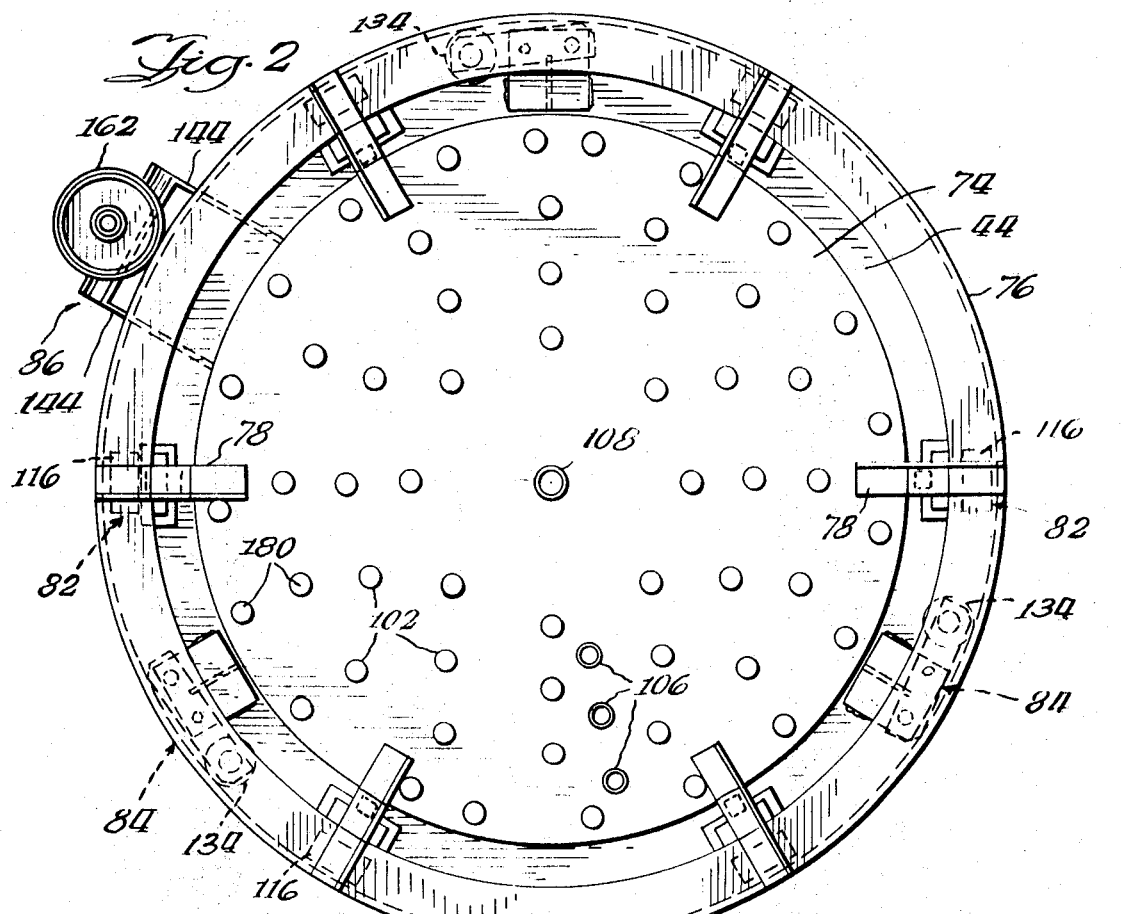
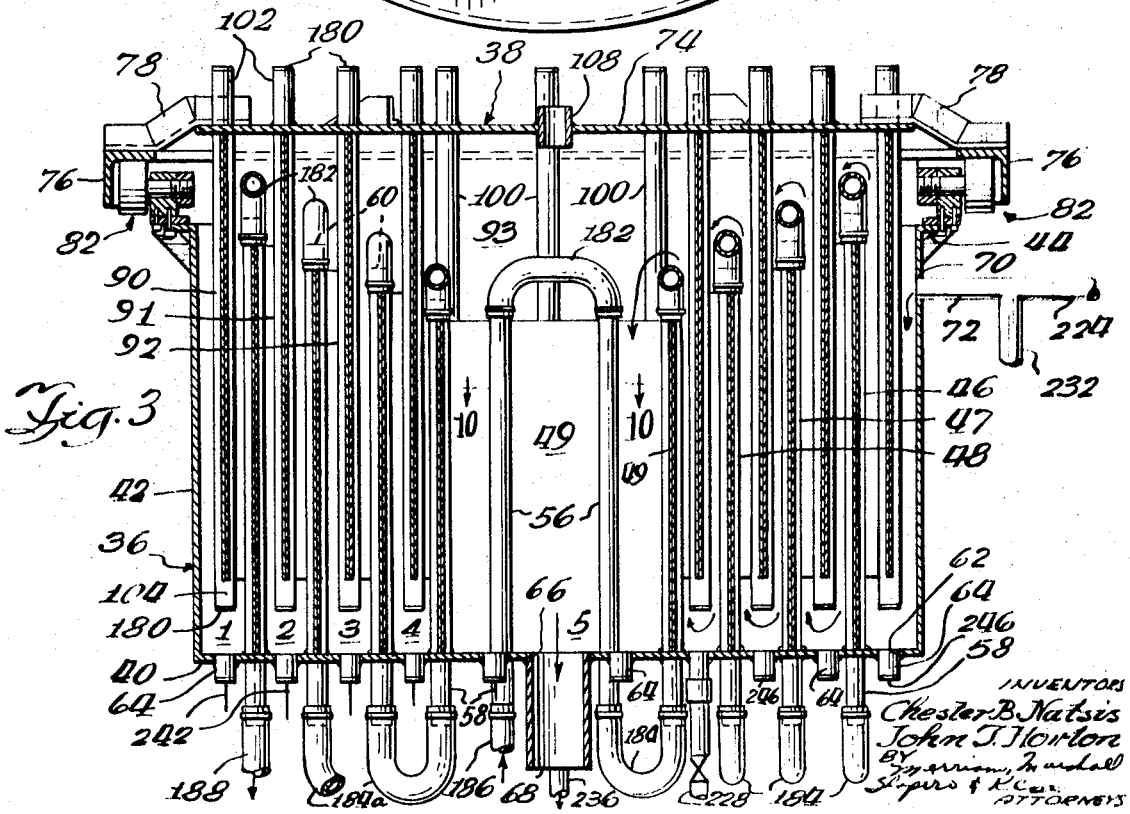

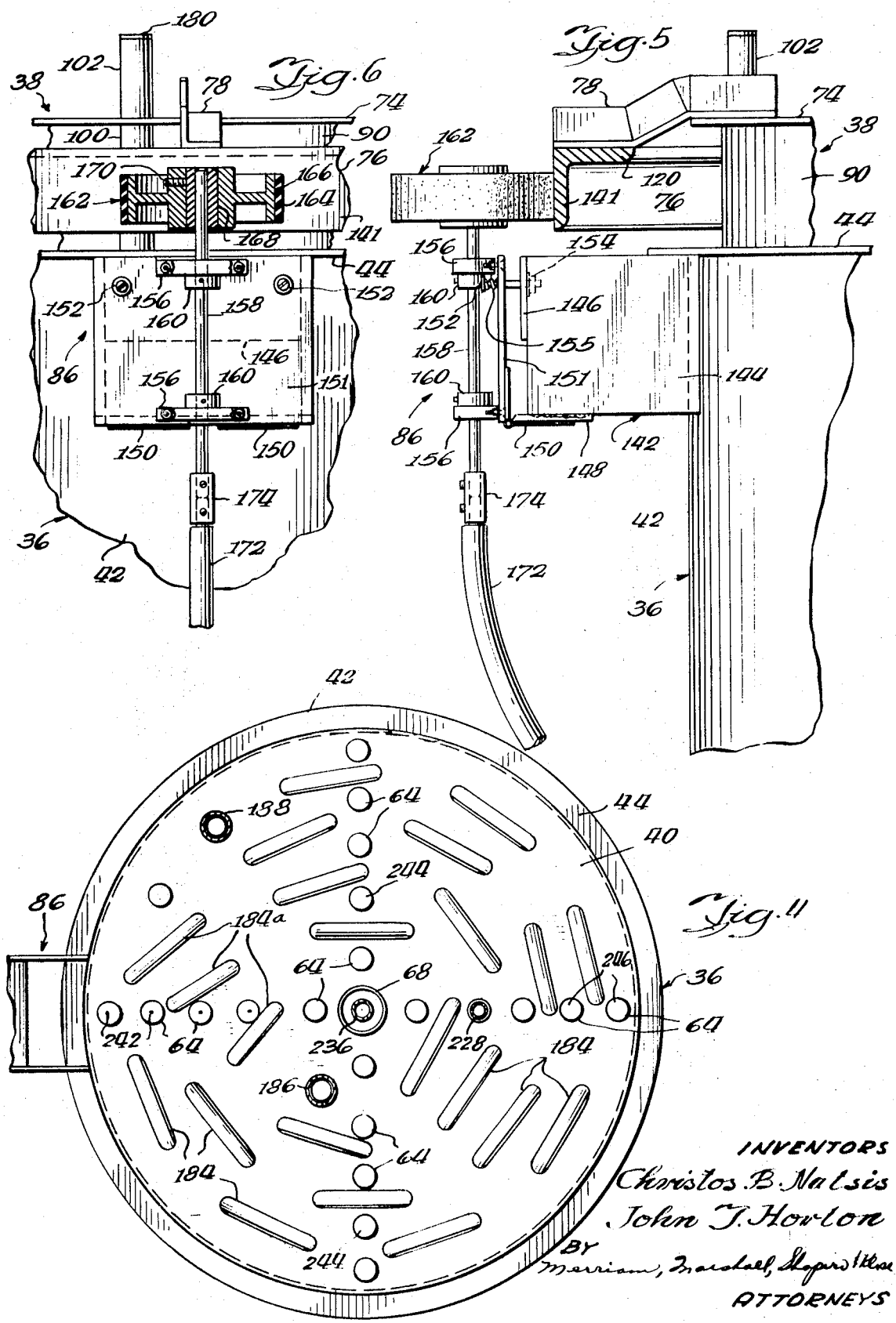

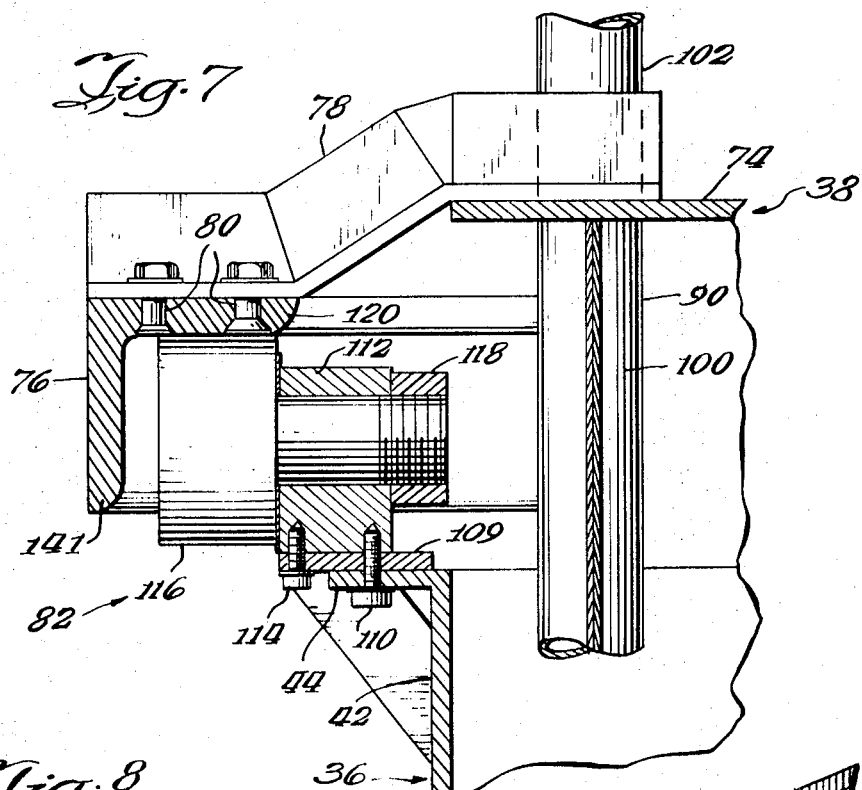
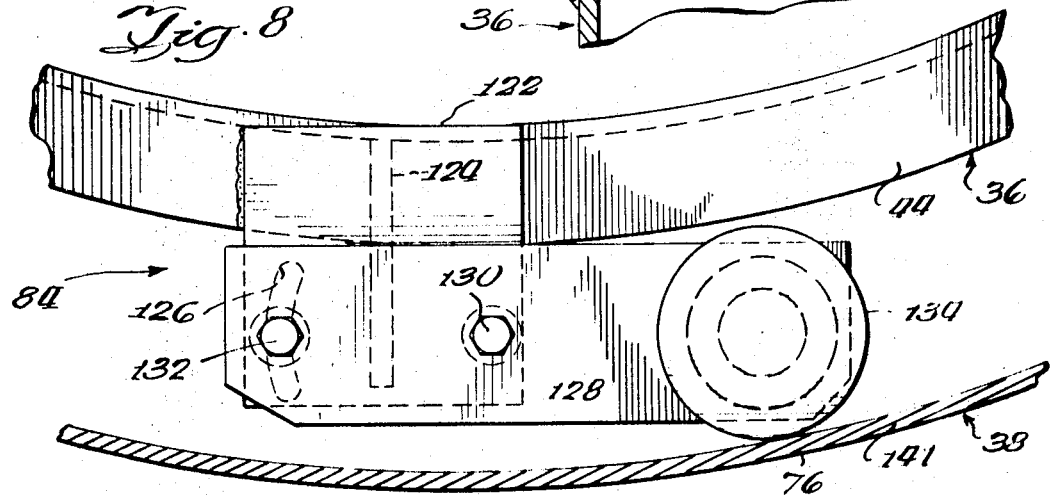
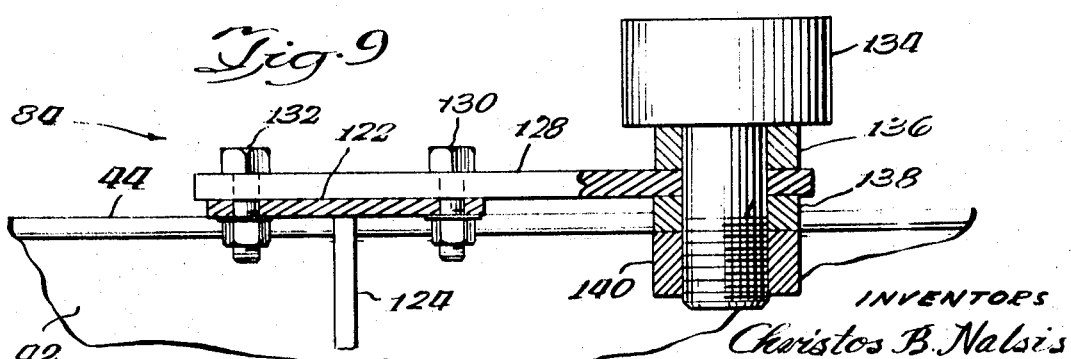

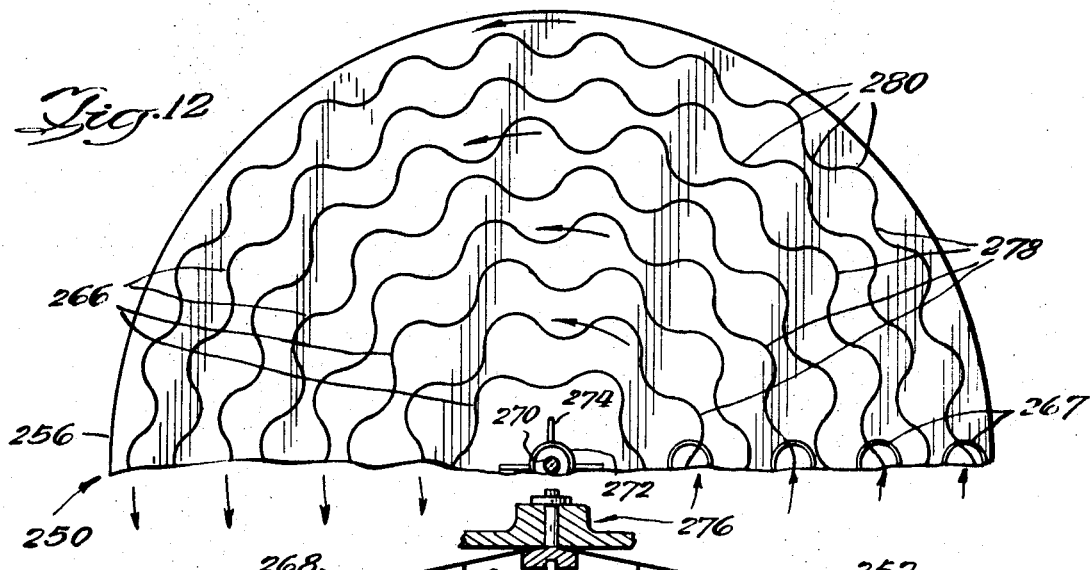
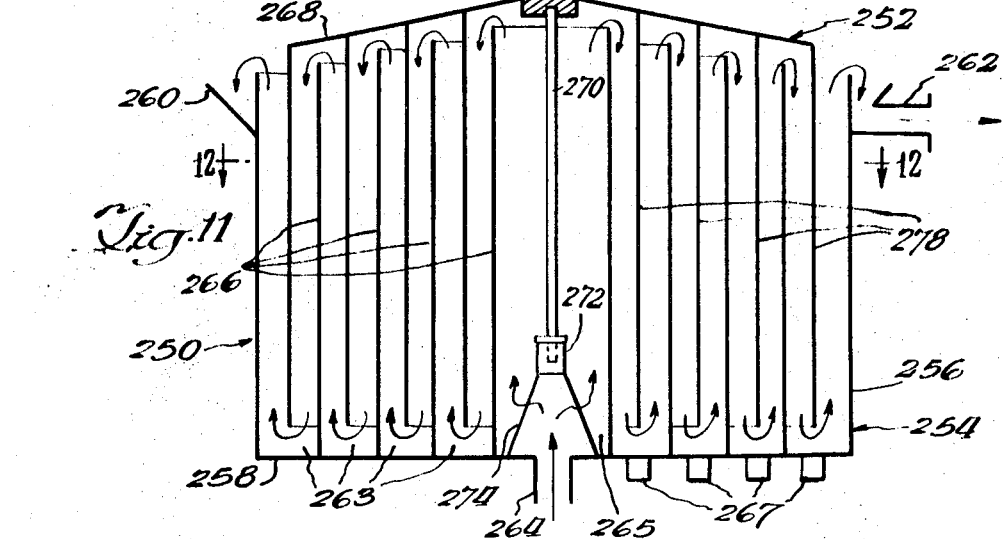
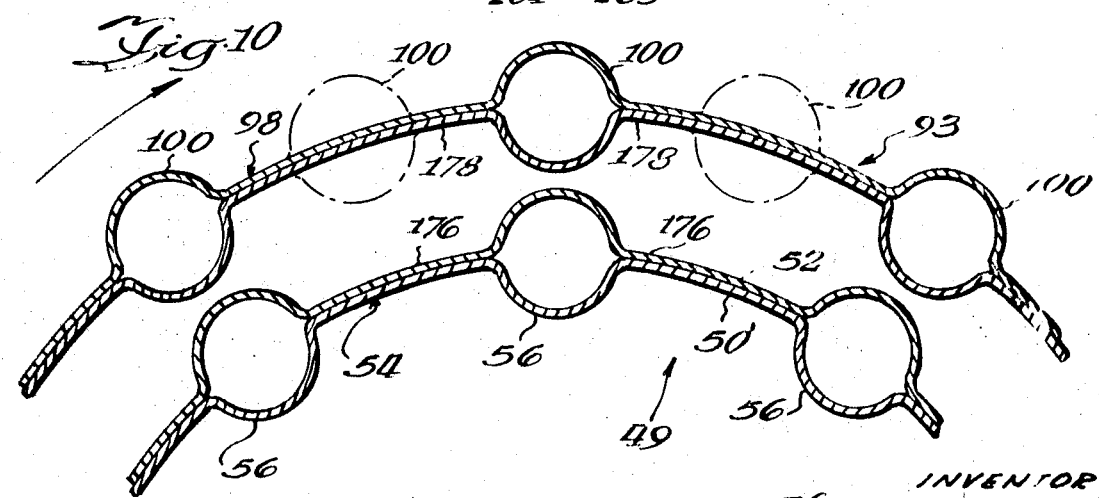
INVENTORS
Christos B. Nalsis
John T. Horton
BY Merriam, Marshall, Shapiro & Klose
ATTORNEYS

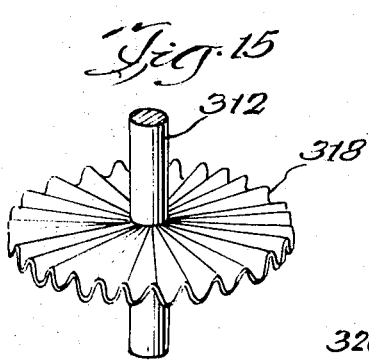
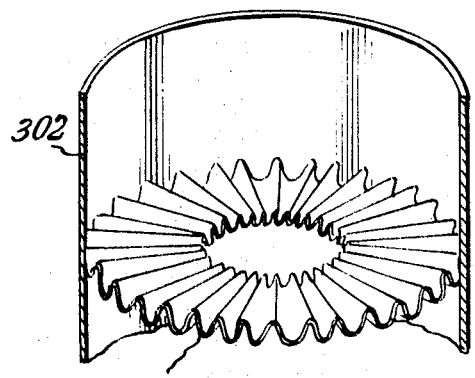
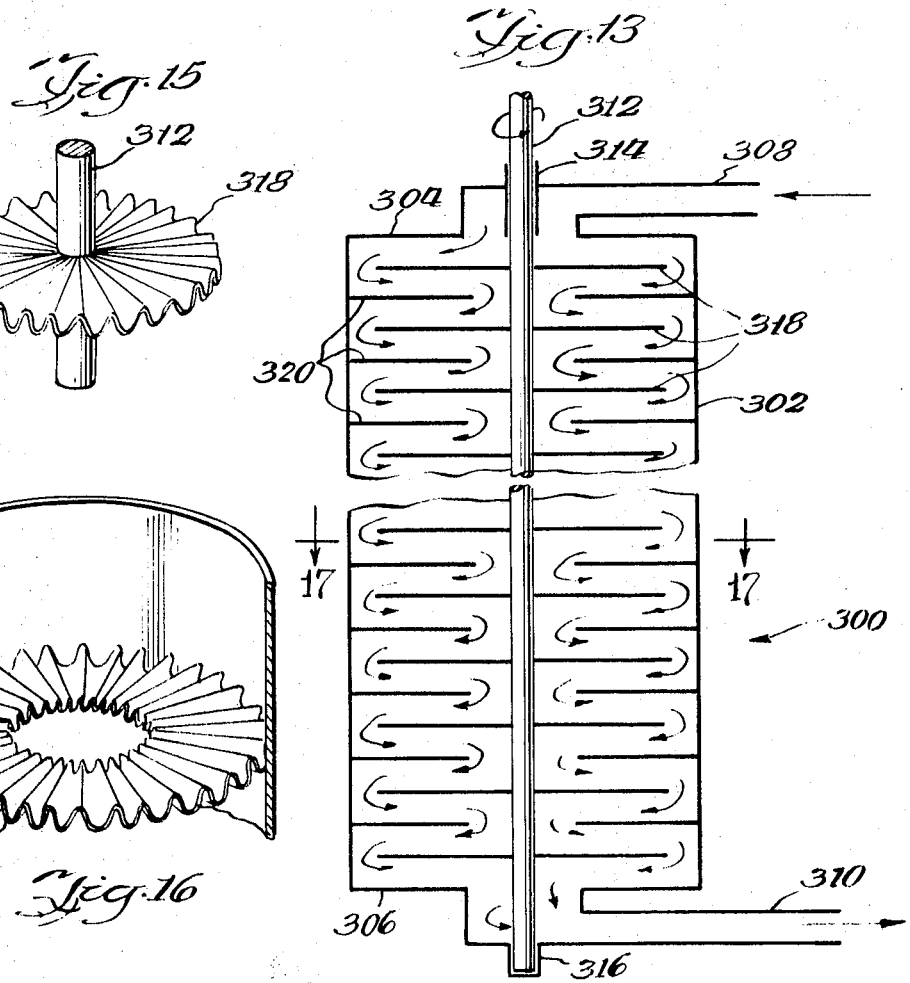
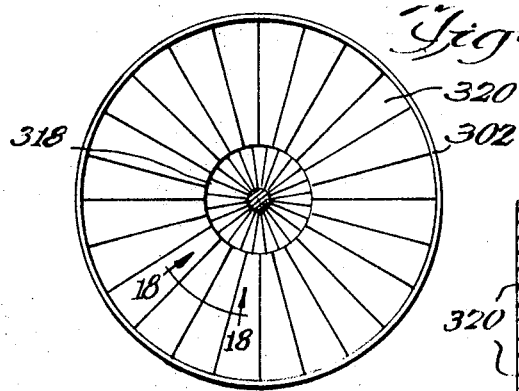
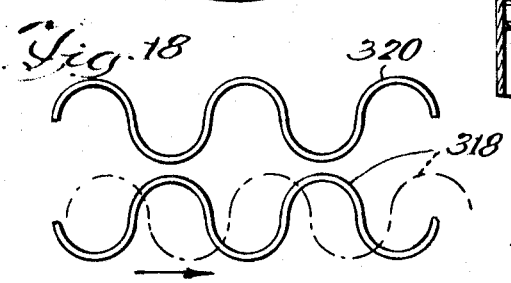
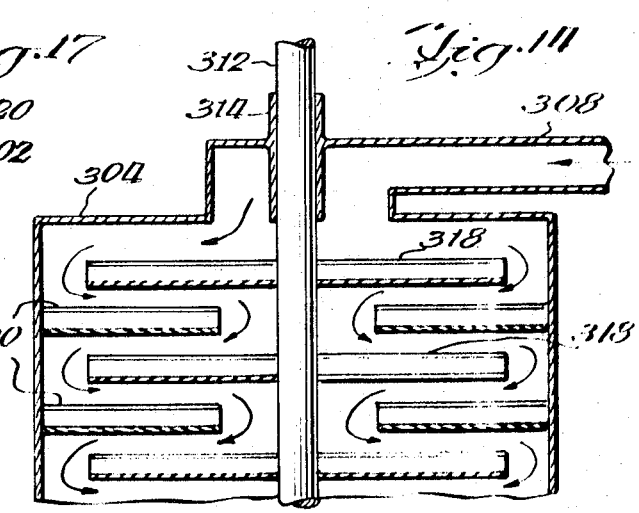

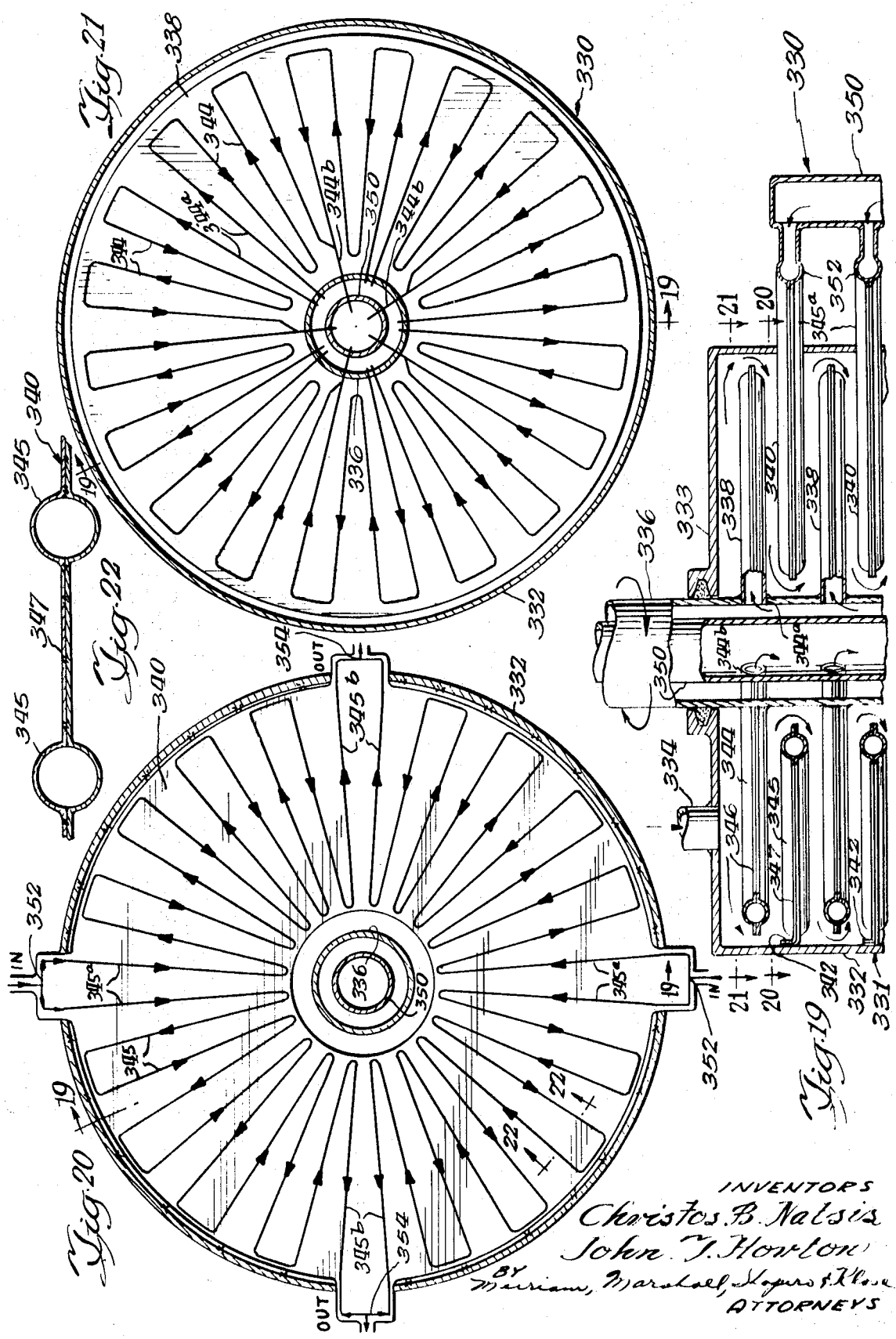

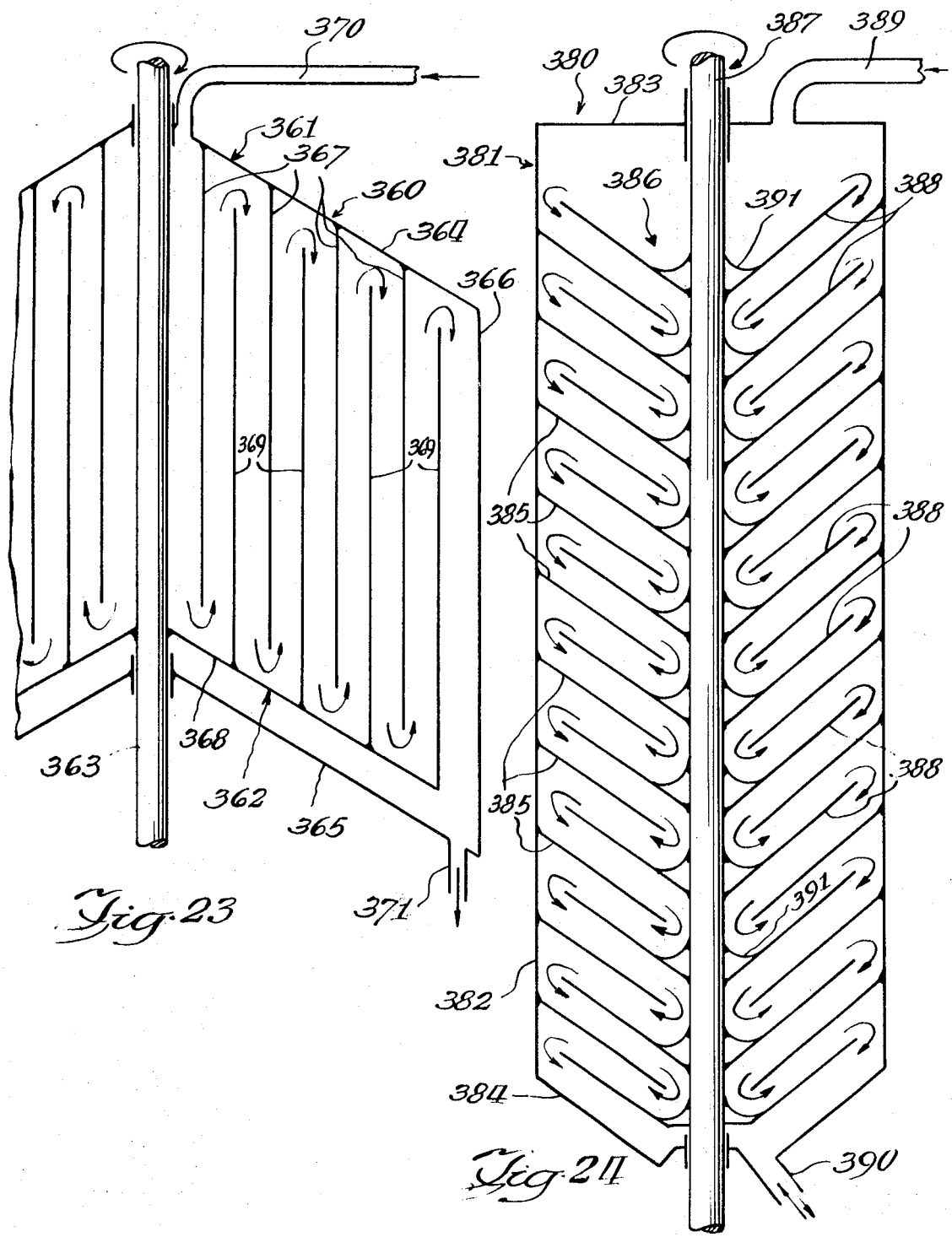

3,617,382

MIXING APPARATUS AS USED IN MASS AND HEAT TRANSFER PROCESSES

This invention relates to mixing apparatus and to a crystallization process conducted therewith. More particularly, the invention relates to apparatus for producing specific turbulent mixing of fluids during flow through the apparatus, resulting in high heat transfer, mass transfer, and/or reaction rate, and to use of the apparatus such as in a continuous crystallization process.

The practical utilization of various chemical and physical processes depends upon sufficient mixing or agitation of one or more fluids to achieve the necessary heat transfer, mass transfer, or reaction at suitable rates. While numerous types of mixing apparatus are available, it would be desirable to provide apparatus affording a specific mode of mixing and greater mixing efficiency, thereby increasing heat and mass transfer and reaction rates, to decrease operating time, increase production, and minimize equipment and space requirements. Also, apparatus providing greater mixing efficiency would increase the feasibility of processes posing difficult heat or mass transfer, or reactant mixing problems.

A particular existing problem concerns the crystallization of materials, especially sugars, from viscous solutions. In handling materials such as these, batch crystallization has been the rule rather than the exception. Much effort has been expended to convert these batch operations to continuous processes, with little success heretofore. Ordinary methods are not applicable to sugar solutions, due to their tendency to become highly supersaturated. This tendency is caused by the relatively high viscosity of sugar solutions and sugar slurries, resulting in low mass transfer rates. Under such conditions, it is most difficult to obtain controlled crystal growth, and if the level of supersaturation becomes too high, shocking or spontaneous nucleation occurs.

The present invention provides a new and improved mixing apparatus or contactor that produces intensive ordered mixing with resulting high heat and mass transfer and reaction rates, and is especially advantageous for stagewise processing of fluids and fluids mixed with solids, particularly viscous solutions and mixtures. The apparatus may be employed to advantage in various operations including crystallization, flocculation as in water and waste treatment, liquid-liquid, solid-liquid, and gas-liquid contacting and extraction, chemical reaction, biochemical reaction, sludge digestion, and other chemical and physical processes. The apparatus may provide for heat exchange, thereby being adapted for use as a heat exchanger and for conducting endothermic and exothermic processes therewith.

The invention also provides a new and improved continuous process for crystallizing a substance from a viscous solution, which is particularly adapted for sugar crystallization. A superior crystal product is produced at high production rates. Various disadvantages of batch crystallization are obviated, including the difficulty of controlling the batch processes, variations in the size and quality of the product crystals, the frequency of shocking or spontaneous nucleation, and the lack of operational flexibility. The process of the invention may be conducted with a high degree of product control, and without shocking and its accompanying time and production losses and cost increases. The process may be operated continuously, and yet the conditions may be adjusted readily when necessary or desirable.

The new mixing apparatus of the invention includes a bank of spaced baffles, closure means providing with the baffles a tortuous flow path through the bank, and means mounting the baffles for relative rotation between adjacent baffles, the baffles including rib means projecting laterally from opposite sides thereof, the rib means extending transversely of the direction of relative rotation and, preferably, projecting into close proximity to rib means of adjacent baffles, whereby relative rotation between adjacent baffles produces alternate shearing and mixing of portions of a fluid contained between the adjacent baffles, and more specifically in the pockets created between neighboring ribs, conduits or corrugations. The fluid follows a micro- or eddy-type spiral path as it goes from pocket to pocket. The apparatus further preferably includes conduit means in the baffles for circulating a heat transfer fluid therethrough, such conduit means preferably also comprising the rib means. Preferred embodiments of the baffles include horizontally extending baffles comprising alternate disc member and annular members which also induce an Archimides type spiral forward flow, and vertically extending baffles comprising vertically coaxial cylindrical ring members which also induce a spring-shaped forward flow, or similarly arranged conical members.

The new mixing apparatus is adapted for use as a crystallizer by providing fluid inlet and outlet means at opposite ends of the flow path, and recycle conduit means interconnecting the inlet and outlet means. In a preferred embodiment, conduit means interconnect the baffle conduit means in alternate baffles for series flow of a heat transfer fluid through the alternate baffles.

The new continuous process for crystallizing a substance from a viscous solution comprises conducting the solution in a turbulent forward flow path through the bank of baffles, producing relative rotation between adjacent baffles, cooling the solution in the flow path, preferably by circulating a heat transfer fluid through conduit means in the baffle, and cycling a product crystal slurry from a downstream location to an upstream location in the flow path.

The foregoing and other advantages, object, and functions of the invention will be apparent on reference to the specification and to the accompanying drawings illustrating preferred embodiments of the invention, in which like parts are identified by like reference symbols in each of the views and in which:

FIG. 1 is a schematic view of crystallization apparatus embodying the new mixing apparatus in a crystallizer, which also illustrates a continuous process for crystallizing a substance from a viscous solution as conducted with the apparatus;

FIG. 2 is a top plan view of the crystallizer of FIG. 1;

FIG. 3 is a vertical sectional view thereof;

FIG. 4 is a bottom plan view thereof;

FIG. 5 is an enlarged fragmentary side elevational and vertical sectional view thereof, illustrating a drive wheel assembly;

FIG. 6 is a similarly enlarged and elevational and vertical sectional view of the apparatus of FIG. 5;

FIG. 7 is a further enlarged fragmentary elevational and vertical sectional view thereof, illustrating a supporting wheel assembly;

FIG. 8 is a similarly enlarged fragmentary horizontal sectional and plan view thereof, illustrating a centering wheel assembly;

FIG. 9 is a similarly enlarged end elevational and vertical sectional view of the apparatus of FIG. 8;

FIG. 10 is an enlarged fragmentary horizontal sectional view of adjacent baffles in the mixing apparatus, taken on line 10—10 of FIG. 3, illustrating alternate positions of a rotating baffle in full and broken lines, respectively;

FIG. 11 is a schematic view of a second embodiment of the mixing apparatus of the invention;

FIG. 12 is an enlarged schematic half section of the apparatus of FIG. 11, taken on line 12—13 thereof;

FIG. 13 is a schematic view of a third embodiment of the new mixing apparatus;

FIG. 14 is an enlarged fragmentary vertical section view thereof;

FIG. 15 is a fragmentary perspective view thereof, on a smaller scale, illustrating one of two types of baffles employed therein;

FIG. 16 is a fragmentary perspective view thereof on the same scale, with a side wall thereof broken away, illustrating the other type of baffle employed therein;

FIG. 17 is a schematic horizontal sectional view thereof, taken on line 17—17 of FIG. 13;

FIG. 18 is an enlarged fragmentary vertical sectional view of the baffles thereof, taken on line 18—18 of FIG. 17, illustrating alternate positions of a rotating baffle in full and broken lines, respectively;

FIG. 19 is a fragmentary vertical sectional view of a fourth embodiment of the new mixing apparatus, with parts broken away, taken on lines 19—19 of FIGS. 20 and 21;

FIG. 20 is a schematic horizontal sectional view thereof, taken on line 20—20 of FIG. 19;

FIG. 21 is a schematic horizontal sectional view thereof, taken on line 21—21 of FIG. 19;

FIG. 22 is an enlarged vertical sectional view of one of the baffles thereof, taken on line 22—22 of FIG. 20;

FIG. 23 is a schematic view of another embodiment of the invention; and

FIG. 24 is a schematic view of still another embodiment of the invention.

Referring to the drawings, FIGS. 1–10 illustrate apparatus or a system for crystallizing a substance from a viscous solution and the manner in which a continuous crystallization process in conducted therewith. The apparatus includes a crystallizer 30 embodying the new mixing apparatus. The crystallizer is supplied with a solution of a substance to be crystallized from a feed tank 32. A cooling water supply system 34 supplies cooling water to the crystallizer.

Referring to FIGS. 1–4, the crystallizer 30 includes a cylindrical bottom section 36 that is fixedly mounted, and a cylindrical top section 38 that is received in the bottom section vertically coaxially therewith and mounted thereon for rotation about their vertical axis. The bottom section 36 includes a horizontal circular bottom wall 40, a vertical cylindrical outer side wall 42 integral with the outer periphery of the bottom wall, and a horizontal annular flange 44 integral with the upper end of the side wall and extending outwardly therefrom.

Four spaced vertical cylindrical ring member baffles 46–49 are mounted on the bottom wall 40 vertically coaxially with the bottom section 36 and are secured to the bottom wall around their lower edges by welding. As illustrated in FIG. 10, the baffles are constructed of "tube in sheet" material, including two welded laminations 50 and 52 of continuous imperforate sheet material formed to provide laminated sheet portions 54 and vertically extending cylindrical tube portions or tubes 56 extending parallel to the vertical axis of the bottom section and of the baffles. In the illustrative embodiment, the tubes 56 are spaced approximately equidistantly around each baffle, at approximately the same spacing for each baffle. The baffles progressively decrease in height radially of the bottom section, from the outer baffle 46 to the inner baffle 49. The bottom wall 40 is provided with openings registering with the tubes 56, and nipples 58 are secured to the bottom ends of the tubes and extending below the bottom wall. Nipples 60 are secured to the upper ends of the tubes and extend upwardly from the baffles.

The side wall 42 and the baffles 46–49 define with the bottom wall 40 four coaxial annular compartments 1–4 and a central cylindrical compartment 5. Four outlet openings 62 are provided in the bottom wall portion of each compartment, at 90° to each other, and the openings of the several compartments are radially aligned. A nipple 64 is mounted in each opening and extends below the bottom wall. A discharge opening 66 is provided in the bottom wall portion of compartment 5, centrally thereof, and a discharge pipe 68 is mounted in the opening and extends below the bottom wall. An inlet opening 70 is provided in the sidewall 42 adjacent its upper end, and an inlet pipe 72 is mounted therein and extends outwardly therefrom.

The top crystallizer section 38 includes a horizontal circular top wall 74, which is spaced above the bottom section baffles 46–49, at varying distances therefrom. An annular rolled angle bar track 76 is mounted on the top wall and spaced outwardly therefrom, by six mounting brackets 78 welded to the top wall equiangularly therearound and supporting the track by bolts 80 (see FIG. 7). The top section is rotatably mounted on the bottom section 36 by six supporting wheel assemblies 82 and centered thereon by three centering wheel assemblies 84 both engaging the track 76, as described hereinafter. The top section is rotated by a drive wheel assembly 86 which also engages the track and is driven by a variable speed gear motor 88 (FIG. 1), also as described hereinafter.

The top section 38, similarly to the bottom section 36, includes four spaced vertical cylindrical ring member baffles 90–93 welded around their upper edges to the top wall 74 and vertically coaxial with the top and bottom sections. As illustrated in FIG. 10, the baffles are constructed in the same manner as the baffles 46–49 of the bottom section, and include laminated sheet portions 98 and vertically extending tube portions or tubes 100 parallel to the axis of the sections. The tubes are spaced approximately equidistantly around each baffle, except for manufacturing variations in the outer baffle 90 (see FIG. 1). The tube spacings are approximately the same for the several baffles, which spacings are about the same as for the bottom section baffles 46–49. The baffles have the same length, extending for equal distances below the top wall 74, and are spaced equal distances above the bottom wall 40.

Openings are provided in the top wall 70 in register with the top section tubes 100, and nipples 102 are connected to the tubes in the openings and extend upwardly from the top wall. Nipples 104 are joined to the lower ends of the tubes 100 and extend below the top section baffles 90–93. Three vent nipples 106 are mounted in corresponding openings of the top wall 74 in radial alignment, between the top section baffles, and a fourth vent nipple 108 is centrally mounted in the top wall.

It is preferable to space the bottom section baffles 46–49 equal distances apart, and to arrange the top section baffles 91–93 centrally between the bottom section baffles and the outer top section baffle 90 at a like distance from the outer bottom section baffle 46, for uniformity of construction. The apparatus employed in the example which follows is deviated somewhat from the preferred spacings but, nevertheless, provided favorable results.

The construction of the crystallizer 30 provides for introduction of feed solution into the outer annular compartment 1 via the inlet pipe 72, tortuous flow between the bottom section baffles 46–49 and the top section baffles 90–93 interposed therebetween, collection of product slurry in the central compartment 5, and discharge of product slurry through the discharge pipe 68. A mixture of solution and crystals flows downwardly in compartment 1 between the sidewall 42 and the outer top section baffle 90, beneath the baffle, upwardly between the top section baffle and the outer bottom section baffle 46, over the bottom section baffle, downwardly between the latter baffle and the next top section baffle 91, and so on in tortuous flow until the slurry mixture overflows the innermost bottom section baffle 49 and is collected in the central compartment 5. The progressively decreasing height of the bottom section baffles 46–49 provides cascading fluid flow through the crystallizer.

In the illustrative embodiment, the top section 38 is rotated on the bottom section 36, although either or both sections could be rotated to produce relative rotation between them. Referring to FIG. 7, the top section is mounted for rotation about the central vertical axis of the crystallizer on the supporting wheel assemblies 82 mounted on the bottom section 36. Each wheel assembly includes a mounting plate 109 secured to the bottom section flange 44 by screws 110, and a bearing block 112 secured to the mounting plate by screws 114 and by the mounting plate screws 110. A support wheel 116 is rotatably mounted in the bearing block and secured by a nut 118. Each support wheel rollably engages the inner surface of a horizontal flange 120 of the track 76 on the top section.

Referring to FIGS. 8 and 9, the top section 38 is maintained in proper axial alignment by the centering wheel assemblies 84. Each assembly includes a mounting plate 122 welded to the top of the bottom section flange 44, and a strut 124 welded to the bottom section and to the mounting plate. An arcuate adjustment slot 126 is provided in the mounting plate. A pivot arm 128 is pivotally secured on the mounting plate by a pivot bolt 130 and by an adjustment bolt 132 extending through the adjustment slot 126. A centering wheel 134 is rotatably mounted on the pivot arm, in bearings 136 and 138 on opposite sides thereof, and is secured by a nut 140. The wheel engages the inner surface of a vertical flange 141 on the track 76. The position of the pivot arm is adjusted for suitable disposition of each centering wheel by securing the adjustment bolt 132 in an appropriate position in the adjustment slot 126.

Referring to the FIG. 1, 5, and 6, the top section 38 is rotated at a selected rate by the drive wheel assembly 86, driven by the variable speed gear motor 88. The drive wheel assembly includes a wheel support bracket 142 consisting of side plates 144 welded to the bottom section 36, and front and bottom crossbars 146 and 148 welded to the sideplates. Two hinges 150 are secured to the bottom crossbar and to a shaft mounting plate 151. The mounting plate is adjustably and movably secured in upright position by adjustment screws 152 extending through the mounting plate and received in nuts 154 on the inner surface of the front crossbar 146, and compression springs 155 inserted between the mounting plate and the screwheads.

Two vertically spaced bearing block 156 are mounted on the outer face of the shaft mounting plate 151, and a wheel drive shaft 158 is journaled therein. Spacer collars 160 are adjustably secured on the drive shaft between the bearing block, for locating the shaft vertically with respect to the wheel support bracket 142. A drive wheel 162 including a rubber tire 164 on the rim 166 thereof is mounted on the upper end of the drive shaft 158, by means of a spacer sleeve 168 thereon and a setscrew 170 extending through the wheel hub. The drive wheel 162 frictionally engages the outer surface of the vertical flange 141 on the track 76, for rotating the upper section 38. The drive shaft 158 is drivingly connected to a sheathed flexible shaft 172 by a coupling 174, and the flexible shaft is drivingly connected to the gear motor 88.

Rotation of the top section 38 produces relative motion between the upwardly extending baffles 46–49 on the bottom section and the downwardly extending baffles 90–93 on the top section, as illustrated in FIG. 10 for the adjacent baffles 49 and 93 on the bottom and top sections, respectively. In the preferred illustrative embodiment, the tubes 56 and 100 function as ribs on the baffles, and they project laterally into close proximity or are contiguous to the tubes of adjacent baffles. The lateral spacing between the tubes of adjacent baffles is such that relative rotation of the baffles produces alternate shearing and mixing of portions of a fluid contained between the adjacent baffles. Preferably, the tubes 56 and 100 project from the respective baffles for a combined distance of at least one-half to nearly the full distance between the sheet portions 54 and 98.

Thus, recesses or pockets 176 are formed between projecting portions of the tubes 56 and the adjacent sheet portions 54 of the bottom section baffle 49, and like recesses 178 are formed on the top section baffle 93. With the described relative rotation between the baffles, portions of the fluid contained in the recesses tend to be moved by the moving baffle 93 and held by the fixed baffle 49, resulting in a shearing action as opposed recesses move out of register, as illustrated by the successive positions of the tubes 100 shown in broken lines in FIG. 10. The sheared portions together preferably represent at least one-half of the fluid volume or space between opposed recesses 176 and 178.

As the moving baffle 93 reaches a successive position of alignment of each pair of tubes 100 in the moving baffle with a successive pair of tubes 56 in the fixed baffle, the recesses 178 in the moving baffle and the fluid portions contained therein come into register with successive recesses 176 in the fixed baffle and fluid portions therein, and mixing of the fluid portions in the respective opposing recesses takes place. This alternate shearing of fluid portions and mixing of sheared portions on one baffle with successive sheared portions on an adjacent baffle takes place continuously throughout the crystallizer, as the slurry flows between the baffles therein. As result, intensive ordered mixing is produced, and efficient crystallization takes place in successive compartment 1–4.

During the crystallization process, sensible heat introduced with feed solution and heat of crystallization are removed from the fluid slurry. The tubes 56 and 100 may serve as conduits in the baffles for circulating a heat transfer fluid through the baffles. The heat transfer fluid may be circulated through some or all of the tubes, as desired, in any suitable flow pattern.

In the illustrative embodiment, cooling water is circulated only through the tubes 56 of the bottom section 36, in series flow in each baffle, and in series flow through the several baffles 46–49, countercurrently to the fluid flow. Thus, the tubes 56 on the bottom section 36 are interconnected for series flow in each baffle by hoses 182 on the nipples 60 at their upper ends and by hoses 184 on the nipples 58 at their lower ends, or by other suitable connections. The top section tubes 100 are not used for circulating cooling water but are plugged, by plugs 180 inserted in the ends of the upper and lower nipples 102 and 104 thereon. one of the bottom section tubes 56, on the baffle 46, also is plugged. The baffles are interconnected by hoses 184a on the lower nipples 58, for series flow through the several baffles 46–49.

Cooling water is supplied to the central baffle 49 from the cooling water supply system 35, via a supply line 186 connected to the nipple 58 at the bottom of one of the tubes 56. The cooling water is discharged at the bottom of one of the tubes 56 in the outermost baffle 46 and returned to the supply system via a return line 188.

The cooling water constitutes tempered city or tap water. As illustrated in Fig. 1, the supply system 34 includes a valved fresh water line 190 and a valved hot water line 192 connected to a rotameter 194 in the valved supply line 186. Cooling water is returned by the valved return line 188 to a storage tank 196. Hot water is circulated from the storage tank by a pump 198, through a valved circulating line 199 to a heat exchanger 200, to a reservoir 202 provided with an overflow line 204, and through a line 206 back to the storage tank 196. Hot water also is conducted from the circulating line 199 through the hot water line 192. The fresh water line 190, the hot water line 192, the circulating line 199, and the supply lien 186 are valved for controlling the rate and temperature of the cooling water supply.

Feed solution is supplied to the crystallizer 30 from the feed tank 32. The tank includes a steam coil 208 supplied by a steam line 210 and regulated by a temperature controller 212 electrically connected to a solenoid valve 214 in the steam line. The contents of the feed tank are agitated by a mixer 215. A thermocouple 216 is provided for monitoring the temperature of the solution in the feed tank. A pump 218 serves to withdraw feed solution from the tank through a removal line 220. The pump recycles feed solution through a valved line 222, and also pumps solution through a valved feed line 224 provided with a rotameter 226. The feedline is connected to the inlet pipe 72 on the sidewall 42 of the crystallizer.

A quantity of the crystal slurry produced is recycled for continuous crystallization. In the illustrative embodiment, slurry is withdrawn at the bottom of compartment 4 and withdrawn to the inlet to compartment 1. The slurry is withdrawn through a nipple 64 and a valved withdrawal line 228, by means of a pump 230. The slurry is pumped through a valved recycle line 232 and a rotameter 234 therein, to the inlet pipe 72, where the slurry is mixed with feed solution from the line 224. Alternatively, recycle slurry may be withdrawn from and cycled to one or more other or additional crystallizer compartments.

Product slurry is removed through a valved line 236 connected to the discharge pipe 68. The product is discharged through a valved line 238 leading to a centrifuge, filter, or other apparatus for separating the crystals from the mother liquor. Also, a valved branchline 240 is connected to the discharge line 236, for conducting the product slurry to the feed tank 32. The product may be returned to the feed tank during startup or when making process adjustment. In the illustrative example which follows, the product was returned to the feed tank during evaluation of the process. Alternatively, product slurry may be withdrawn from one or more other or additional crystallizer compartments.

Additional equipment employed with the crystallizer includes thermocouples 242 inserted into the bottoms of compartments 1-4, through the nipples 64, for monitoring the compartment temperatures. Sample valves 244 are connected to other nipples 64 of the several compartments. Those nipples 64 which are not used are closed by plugs 246.

The feed solution and crystal slurry flow through the compartment 1-4 in the crystallizer at decreasing average residence time, owing to the decreasing cross section of flow areas of the annuli between the baffles. The linear rate of rotation of the baffles 90-93 decreases towards the center of the crystallizer. The mixing conditions thus vary progressively from compartment 1 to compartment 4, and intensive ordered mixing takes place at desired stagewise changing intensity. High mass transfer or crystallization rates and high heat transfer rates are achieved. Other advantage may be taken of the stagewise operation in conducting crystallization and other processes. Thus, for example, materials may be introduced or removed from one or more selected stages, and conditions may be altered selectively in any stage.

In operation, a crystal slurry is built in the crystallizer, in a manner such as described in the example which follows. The top section 38 of the crystallizer is rotated, while cooling water from the supply system 34 is circulated through the baffles 46-49. A product crystal slurry is cycled from a downstream location to an upstream location in the fluid flow path, from compartment 4 to the inlet 72 to compartment 1 in the illustrative embodiment. The feed solution is supplied to the inlet of compartment 1 from the feed tank 32. When steady state conditions are reached, the product is withdrawn from the discharge pipe 68, and the crystals are separated from the mother liquor. Alternatively, product may be withdrawn from other compartments.

FIGS. 11 and 12 illustrate an other embodiment of mixing apparatus 250 which may be employed for various processes. The apparatus includes a top section 252 rotatably mounted on a bottom section 254 coaxially therewith. The bottom section includes a cylindrical sidewall 256 and an integral circular bottom wall 258. A collecting trough 260 is provided around the upper end of the side wall, and a discharge outlet 262 is connected to the trough. A central fluid inlet 264 is provided in the bottom wall. Spaced parallel vertically coaxial cylindrical ring baffles 266, four of which are shown, are mounted on the bottom wall, and provide annular compartments 263 and one central cylindrical compartment 265 in the apparatus. The baffles decrease in height progressively outwardly from the center baffle. Drain outlets 267 are provided for the several annular compartments.

The top section 252 includes a top wall 268 and an axial shaft 270 extending downwardly at the center thereof. The shaft is seated on a thrust bearing 272 secured to a spider or stand 274, in turn mounted on the bottom wall 258. Apparatus 276 is mounted on the top wall 268 for connection to drive means, not shown, for rotating the top section 252.

Four spaced parallel cylindrical ring baffles 278 are mounted on the top wall 268 and extend downwardly therefrom into the annular compartments 263 approximately centrally thereof, to points equidistantly spaced above the bottom wall 258. Similarly, the baffles 266 of the bottom section extend upwardly to points spaced below the top wall 268. The top section baffles 278 are vertically coaxial with each other and with the bottom section baffles 266. By this construction, fluid supplied to the inlet 264 overflows the inner baffle 266 and thereafter flows in a tortuous path between baffles and in cascading flow over the bottom wall baffles 266, ultimately overflowing the side wall 256 and being collected in the trough 260 for discharge through the outlet 262.

The baffles 266 and 278 have sinuouslike corrugations 280 extending vertically in parallel to the central vertical axis of the mixing apparatus 250. The corrugations project laterally into close proximity to the corrugations of adjacent baffles, whereby relative rotation produces alternate shearing and mixing of portions of a fluid contained between adjacent baffles. In this manner, intensive ordered mixing is accomplished in a stagewise manner similar to the preceding embodiment of apparatus 30. In the second embodiment of apparatus 250, no provision is made for heat transfer. The direction of fluid flow in the apparatus 250 also is form the center compartment to the outer compartment, with flow velocity decreasing and the linear velocity of the rotating baffles 278 increasing progressively in successive stages. The apparatus 250 may be employed, for example, as a flocculator.

The mixing apparatus represented by the foregoing embodiments may be constructed in other ways to provide intensive ordered mixing, with or without provision for heat exchange. Thus, for example, where heat transfer fluid conduits are desired, hollow rib means other than the cylindrical tubes 56 and 100 of the crystallizer 30 may be provided, such as tubes of elliptical, circular, rectangular, hexagonal, and other shapes, which may be incorporated with flat or undulating sheet material. Alternatively, heat transfer fluid conduits may be provided in the baffles in other ways. Baffles such as the baffles 266 and 278 of the mixing apparatus 250 may be corrugated in various profile configurations, such as semicircular, semiellipsoidal, sinusoidal, hyperbolic, parabolic, trapezoidal, triangular, rectangular, and other configurations, and combinations thereof. Rib means may be provided in other ways, such as by employing bars, fins, and the like. The rib means may extend parallel to the axis of rotation, or may extend transversely of the direction of rotation in other ways, such as angularly thereto or along curved lines.

The mixing apparatus may be employed in other processes, such as extraction, contacting operations, chemical and biochemical reactions, heat exchanging, and other chemical and/or physical processes where high heat transfer, mass transfer, or reaction rates are necessary or desirable. The apparatus may be open to atmospheric pressure, as in the illustrative embodiments, or may be pressurized or evacuated, with suitable provisions for sealing the apparatus when operating at other than atmospheric pressure.

In the embodiment of FIGS. 13-18, mixing apparatus 300 incorporates horizontally extending baffles providing tortuous fluid flow between the top and the bottom of the apparatus. The apparatus includes a cylindrical side wall 302 and circular top and bottom walls 304 and 306, which provide a closed cylindrical vessel. A fluid inlet 308 is connected to the center of the top wall, and a fluid outlet 310 is connected to the center of the bottom wall. A shaft 312 is mounted in bearings 314 and 316 at the top and bottom of apparatus, for rotation about the central vertical axis of the apparatus. Horizontal corrugated circular disc baffles 318 are secured in spaced parallel relation on the shaft 312, and they extend equidistantly to points spaced inwardly from the side wall 302. Horizontal corrugated annular baffles 320 are secured in spaced parallel relation on the sidewall 302 and are interspersed between the disc baffles 318 and spaced equidistantly therefrom. The annular baffles extend equidistantly to points spaced outwardly from the shaft 312.

The baffles 318 and 320 extend radially in overlapping relation to each other. The corrugations in the illustrative embodiment have semicircular configurations, and extend at equal angles from the axis of the shaft 312. The corrugations project vertically or laterally into close proximity to the corrugations of adjacent baffles, whereby rotation of the shaft 312 and of the baffles 318 thereon produces alternate shearing and mixing of portions of fluid contained between adjacent baffles, similarly to the action of the preceding embodiments of the mixing apparatus.

A fluid introduced through the inlet 308 follows a turbulent forward flow path, as indicated by the arrows in the drawing, outwardly on the disc baffles 318 and inwardly on the annular baffles 320, as the shaft 312 rotates. In this embodiment also, intensive ordered mixing is achieved, in successive stages in the compartments defined by successive pairs of annular baffles 320 and the sidewall 302 forming a closure. The shearing and mixing action is illustrated in FIG. 18, and it is similar in this respect to the embodiment illustrated in FIG. 10.

FIGS. 19-22 illustrate mixing apparatus 330 similar to the apparatus 300 of the preceding embodiment, with provision for heat transfer. The apparatus 330 includes a closed cylindrical vessel 331 having a sidewall 332, a top wall 333 provided with a fluid inlet 334, and a bottom wall provided with a fluid outlet, both not illustrated. A hollow cylindrical shaft 336 is mounted axially of the vessel, and horizontal disc baffles 338 are secured thereon in spaced parallel relation and extending uniformly to points spaced inwardly from the sidewall of the cylinder. Horizontal annular baffles 340 are mounted on the sidewall 332 in spaced parallel relation, being secured thereto by integral flanges 342 extending around the wall. As in the preceding embodiment, the annular baffles are interspersed equidistantly between the disc member baffles.

As illustrated in FIG. 22 by a portion of an annular baffle 340, the baffles 338 and 340 are constructed similarly to the baffles illustrated in FIG. 10, in that they are formed of tube in sheet material providing tube portions or tubes 344 and 345 and sheet portions 346 and 347, the latter being planar in this case. As illustrated in FIGS. 20 and 21, the tubes 345 in the annular baffles 340 and the tubes 344 in the disc baffles 338 extend radially from the vertical axis of the apparatus, and adjacent tubes are integrally connected at their ends by like tube sections to provide a sinuous flow path for heat transfer fluid therein. In each of the disc baffles 338, the tubes 344 are arranged in five units of interconnected tubes, and heat transfer fluid is supplied to tubes 344a at the opposite end of each unit and discharged from a tube 344b at the center of each unit. In each of the annular baffles 340, the tubes 345 are arranged in four interconnected units, and heat transfer fluid is supplied to a tube 345a at one end and discharged from a tube 345b at the opposite end of each unit.

A cylindrical fluid return tube 350 is mounted within the shaft 336 for rotation therewith and spaced therefrom. Heat transfer fluid is supplied to the annulus between the tube and the shaft. The fluid flows into the inner ends of the input tubes 344a of the disc baffles 338, which tubes are connected to the shaft 336 and register with corresponding openings therein. The discharge tubes 344b extend through the shaft 336 and into the interior of the return tube 350 for discharge thereinto.

Input manifolds 350 supply heat exchange fluid to the tubes 345 in the annular baffles 340, and similar return manifolds, not shown, removed heat transfer fluid from the baffles. Adjacent input tubes 345 are joined to an input manifold by a tee connection 352, and, similarly, adjacent discharge tubes 345b are joined to a return manifold by a tee connection 354. Alternatively, the tubes 344 and 345 may be connected and supplied with heat transfer fluid in other ways. For example, successive baffles may be supplied in series instead of in parallel, and various flow paths may be established.

FIG. 23 illustrates another embodiment of mixing or conditioning apparatus 360. The apparatus includes a top section 361 mounted stationary and a bottom section 362 rotatably mounted on shaft 363 coaxially to the top section 361. The top section 361 has a conical top 364 and a conical bottom 365. Depending from conical top 364 is cylindrical outer wall 366 which joins at its lower edge with bottom 365. A plurality of cylindrical ring baffles 367 are joined at their upper edges to the inner side of top 364. The bottom section 362 has a conical bottom 368 joined to shaft 363. A plurality of cylindrical baffles 369 are joined at their lower edges to bottom 368. Fluid material to be mixed or otherwise treated or conditioned is introduced by means of conduit 370 and after flowing through the paths as illustrated by the arrows on FIG. 23 is removed from the apparatus by conduit 371. It should be understood that baffles 367 and 369 have ribs or corrugations as described with respect to the previous structures illustrated by the drawings. The apparatus of FIG. 23, because of its conical structure, provides an especially strong and rigid piece of equipment. When desired, a plurality of structures such as shown in FIG. 23 can be placed vertically in series as in a column arrangement using a common shaft 363 and a common outer wall 366 for the entire structure.

FIG. 24 shows another embodiment of the invention with the contact apparatus illustrated being related to that shown in FIG. 13. The mixing or conditioning apparatus 380 of FIG. 24 has an outer stationary section 381 comprising a cylindrical tubular element 382 with a top 383 and conical bottom 384. The outer section 380 has a plurality of conical baffles 385 joined to the inside surface of element 382. An inner rotatable section 386 comprises shaft 387 which supports a plurality of conical baffles 388. Each baffle 388 is generally spaced to be positioned between a pair of adjoining baffles 385. Inlet 389 supplies the fluid to be treated or mixed in the apparatus and conduit 390 provides the outlet means. Rounded corner plates 391, while not essential, can be used when advisable to smooth out the flow path. Baffles 385 and 388 are provided with ribs or corrugations in a manner similar to those illustrated in FIGS. 15, 16 and 22.

The baffles of the embodiments of FIGS. 13-18, 19-22 and 23 may, alternatively, extend horizontally and at an inclination from the central shafts and the side walls. As in the embodiments of FIGS. 1-10 and 11-12, the corrugations and the conduits for fluid flow may take various configurations and extend transversely of the direction of rotation in various directions other than radially. Fluid flow through the apparatus may take place downwardly, upwardly, or countercurrently, with the apparatus at atmospheric, superatmospheric or subatmospheric pressure. Materials may be supplied and/or withdrawn at various other points in the column provided by the apparatus.

The apparatus of FIGS. 13-18, 19-22 and 24 subjects the fluid flowing therethrough to intensive ordered mixing, which increases in intensity as the fluid flows radially outwardly and decreases in intensity with radial inward flow. The velocity of fluid flow decreases with radial outward flow and increases with radial inward flow. The average mixing intensity and flow rate in each successive stage are substantially the same. On the other hand, in the apparatus of FIGS. 1-10, 11-12 and 23, the mixing intensity decreases and the flow rate increases radially inwardly, so that the average mixing intensity and flow rate change progressively from stage to stage.

The apparatus of FIGS. 13-18, 19-22 and 24, similar to the preceding embodiments, may be employed for contacting, extraction, flocculation, mixing, crystallization, chemical and biochemical reaction, and other physical and/or chemical processes.

The following example is illustrative of the new process of the invention as conducted in the apparatus thereof. It will be understood that the invention is not limited to the example or to the apparatus, materials, proportions, conditions and procedures described therein.

EXAMPLE

Continuous crystallization of dextrose monohydrate was conducted in apparatus substantially as illustrated in FIGS. 1-10. The equipment included a crystallizer 30 constructed of aluminum. The baffles in each crystallizer section were constructed of "tube in sheet" material, having two laminated sheets each of one-eighth inch thickness and having tubes formed therein of the same thickness and 1 inch inside diameter. The tube spacing in each sheet was approximately 6 inches, except that in the construction of the outer top section baffle 90, two pairs of tubes were spaced about 4 inches apart.

The cylindrical sidewall 42 of the fixed bottom crystallizer section 36 had a height of 24 inches and a diameter of 39¾ inches. The concentric cylindrical baffles of the top and bottom sections 38 and 36 had the following dimensions and number of tubes therein:

| Baffle No. | | Height, in. | Mean Diameter, in. | No. of Tubes |
|---|---|---|---|---|
| Top | Bottom | | | |
| 90 | | | 37.75 | 20 |
| | 46 | 22.5 | 33.5 | 17 |
| 91 | | | 29.25 | 15 |
| | 47 | 21 | 26.25 | 14 |
| 92 | | | 22.5 | 12 |
| | 48 | 19.5 | 19.25 | 10 |
| 93 | | | 15.25 | 8 |
| | 49 | 18 | 12.25 | 6 |

The radial spacing between tubes in adjacent baffles was approximately 3 to 5 inches. The baffles 90–93 of the top section extended to 1.5 inches above the bottom wall 40 of the bottom section exclusive of projecting nipples 104. The discharge pipe 68 had a diameter of 3 inches. The drain outlets 64 were ¾-inch pipe nipples.

The crystallizer 30 had an operating volume of 12.9 cubic feet. The feed tank 32 had a capacity of 300 gallons. Feed solution was supplied to the crystallizer from the tank through the line 224. Recycle slurry was removed from the fourth stage, at the bottom of compartment 4, and was combined with the feed and introduced to the first stage at the top of compartment 1. Cooling water was supplied to the tubes 56 of the inner bottom section baffle 56 through the supply line 186. The coolant flowed through the tubes of baffles 49, 48, 47 and 46 successively, in countercurrent flow to the crystallization slurry, and was returned through the line 188.

Five crystallization runs were made at different conditions, employing solutions of commercial grade dextrose monohydrate dissolved in water as the feed solutions. At the start of each run, 12.9 cubic feet of aqueous sugar solution at a particular dextrose concentration was charged to the crystallizer. The top section 38 of the crystallizer was rotated at 10 r.p.m. The initial charge was cooled to the temperature required to give a specified degree of supersaturation by circulating cooling water, and the temperature was held constant. The solution was then seeded with commercial dextrose monohydrate.

The slurry was then circulated through the crystallizer from the first stage in compartment 1 to the fourth stage in compartment 4, and through the recycle line 232 from the fourth stage to the first stage. The temperature of the slurry was gradually reduced to operating temperature, by circulating cooling water, while maintaining the degree of supersaturation below a selected maximum value.

Feed solution then was supplied to the inlet pipe 72 and there mixed with recycle slurry and introduced to the first stage, while maintaining the desired operating temperature. Product slurry was removed through the discharge pipe 68 and allowed to flow by gravity through the branch line 240 to the feed tank 32, where the crystals were dissolved. The crystallizer was operated continuously in this manner for sufficient time to obtain steady state operation, as determined by constant values of feed rate, feed concentration, operating temperature, supersaturation, and recycle ratio. Product slurry was removed for analysis periodically through the line 236 connected to the discharge pipe and also through the sample valves 244 at the bottom of compartment 1–4. The startup and steady state operating conditions and results for the several runs were as follows, in proportions by weight, Run 4 being a continuation of Run 3, and Run 5 being a continuation of Run 4:

| Run No. | 1 | 2 | 3 | 4 | 5 |
|---|---|---|---|---|---|
| Startup | | | | | |
| Concentration of starting solution, % dextrose | 58.4 | 59.5 | 61 | 61 | 61 |
| Seed concentration, % | 5 | 5 | 5 | 5 | 5 |
| Initial operating temperature, °F. | 84.5 | 72 | 89 | 88 | 89 |
| Initial operating slurry concentration, % solids | 20 | 29 | 29 | 29 | 29 |
| Initial mother liquor concentration, % dissolved dextrose | 54.2 | 53.8 | 53 | 53 | 53 |
| Steady State Operation | | | | | |
| Average feed concentration % dextrose | 61.1 | 61.7 | 61 | | 61 |
| Average feed rate, lbs. per hr. | 25.3 | 36.2 | 12 | 18 | 24 |
| Average operating temperature, °F. | 83.6 | 74 | 88 | 88.5 | 88 |
| Average slurry concentration, % solids | 20 | 28 | 29 | 29 | 29 |
| Average mother liquor concentration, % dissolved dextrose | 54.9 | 49.5 | 52 | 52 | 52 |
| Time, hrs. | 8 | 11.5 | 20.5 | 48.5 | 25 |
| Crystal Production rate, lbs. per hr. | 4.1 | 7.8 | 3.5 | 2.3 | 3.4 |

Screen analysis of the crystalline products obtained during Runs 1–5 are set forth and compared with the analysis of the seed crystals in the table which follows. The samples were removed from the crystallizer at the bottom of compartment 3, at the following times after the start of steady state operation: Run 1, 34 hrs.; Run 2, 75 hrs.; Run 3, 74 hrs.; Run 4, 30 hrs.; Run 5, 30 hrs.

SCREEN ANALYSIS, CUMULATIVE PERCENT ON SCREEN

| U.S. Standard Sieve No. | Run 1 | | Run 2 | | Run 3 | | Run 4, prod. | Run 5 prod. |
|---|---|---|---|---|---|---|---|---|
| | Seed | Prod. | Seed | Prod. | Seed | Prod. | | |
| 30 | 3.8 | 1.0 | 0.5 | 1.5 | 16.5 | 17.1 | 7.7 | 35.4 |
| 50 | 17.1 | 24.8 | 7.0 | 12.5 | 76.6 | 48.6 | 43.7 | 84.8 |
| 80 | 36.6 | 72.6 | 23.4 | 49.1 | 97.4 | 67.8 | 86.2 | 97.8 |
| 100 | 51.7 | 86.5 | 38.6 | 68.7 | 98.8 | 77.0 | 96.1 | 99.5 |
| 120 | 56.7 | 88.8 | 47.0 | 84.5 | 99.2 | 80.9 | 97.9 | 99.8 |
| 140 | 69.9 | 91.6 | 55.4 | 87.5 | | | | |
| 170 | 84.0 | 93.9 | 74.6 | 88.0 | 99.6 | 84.3 | 99.1 | 99.9 |
| 200 | 92.4 | 95.2 | 79.5 | 92.3 | | | | |
| Pan | 100 | 100 | 100 | 100 | 100 | 100 | 100 | 100 |

A comparison of the product of Run 5 with the commercial product, made photographically under nonpolarized light, showed that the crystals from Run 5 contained very little included liquor, whereas the commercial product crystals contained a significant amount of included liquor. A comparison made photographically under polarized light showed a relatively high degree of coloration of the product of Run 5, indicating that the product of Run 5 was of better quality.

The crystallization process illustrated by the foregoing example preferably is conducted at solution concentrations in the crystallizer in the range of about 45–75 percent dissolved dextrose, by weight. The solution concentrations preferably may constitute up to about 10° F. supersaturation. The crystallizer solution temperature preferably is maintained in the range of about 70–120° F. The concentration of the slurry in the crystallizer preferably is maintained in the range of about 15–35 percent, more preferably, about 20–30 percent, by weight. The example illustrates growth rates of about 0.14 to 0.6 lbs./hr./ft.$^3$, and growth rates up to 1.5 lbs./hr./ft.$^3$ and higher are contemplated.

While preferred embodiments of the new apparatus have been described and illustrated, it will be apparent to those skilled in the art that various changes and modifications may be made therein, for use in crystallization and other processes, within the spirit and scope of the invention. Also, while a process for crystallizing dextrose has been illustrated, the invention includes within its scope the crystallization of other materials, including other sugars, from viscous solution. It is intended that all such apparatus and process changes and modifications be included within the scope of the appended claims.

What is claimed is:

1. Mixing apparatus which comprises:
 a bank of horizontally extending spaced baffles,
 said baffles comprising alternate disc members and annular members,
 closure means providing with said baffles a tortuous flow path through said bank, and
 means mounting said baffles for relative rotation between adjacent baffles about a vertical axis through the centers of the baffles,
 said baffles including conduit means for circulating a heat transfer fluid through the baffles,
 said conduit means projecting laterally from opposite sides of said baffles and extending transversely of the direction of said relative rotation.

2. Apparatus as defined in claim 1 including a vertically extending shaft comprising said vertical axis means centrally mounting said disc members on said shaft, a vertically extending cylindrical wall comprising said closure means, and means mounting said annular members on said wall.

3. Apparatus as defined in claim 1 wherein said conduit means extend radially of said axis of rotation.

4. Apparatus as defined in claim 3 wherein said conduit means project into close proximity to conduit means in adjacent baffles, whereby said relative rotation produces alternate shearing and mixing of portions of a fluid contained between adjacent baffles.

5. Mixing apparatus which comprises
 a bank of vertically extending spaced baffles,
 said baffles comprising vertically coaxial cylindrical ring members,
 closure means providing with said baffles a tortuous flow path through said bank, and
 means mounting said baffles for relative rotation between adjacent baffles about their vertical axis,
 said baffles including conduit means for circulating a heat transfer fluid through the baffles,
 said conduit means projecting laterally from opposite sides of said baffles and extending transversely of the direction of said relative rotation.

6. Apparatus as defined in claim 5 wherein said conduit means extend parallel to said axis of rotation.

7. Apparatus as defined in claim 6 wherein said conduit means project into close proximity to conduit means in adjacent baffles, whereby said relative rotation produces alternate shearing and mixing of portions of a fluid contained between adjacent baffles.

8. Apparatus as defined in claim 5 including a horizontally extending bottom wall comprising said closure means, and means mounting alternate baffles on said wall.

9. Apparatus as defined in claim 8 wherein said baffles on said wall progressively decrease in height radially of said axis of rotation for cascading liquid flow.

10. A crystallizer which comprises apparatus as defined in claim 5, fluid inlet and outlet means at opposite ends of said flow path, and recycle conduit means interconnecting said inlet and outlet means.

11. A crystallizer as defined in claim 10 including conduit means interconnecting said baffle conduit means in alternate baffles for series flow of a heat transfer fluid through the alternate baffles.

12. A crystallizer as defined in claim 10 wherein said baffle conduit means project into close proximity to conduit means in adjacent baffles, whereby said relative rotation produces alternate shearing and mixing of portions of a fluid contained between adjacent baffles.

13. A continuous process for crystallizing dextrose from aqueous solution which comprises:
 providing a bank of spaced vertically extending vertically coaxial cylindrical ring baffles including baffles rotatable relative to adjacent baffles about their vertical axis,
 said baffles including conduit means for circulating a heat transfer fluid through the baffles and projecting laterally from opposite sides of the baffles and extending parallel to said axis of rotation,
 said conduit means projecting into close proximity to conduit means in adjacent baffles to produce alternate shearing and mixing of portions of a solution contained between adjacent baffles by relative rotation between the adjacent baffles,
 conducting said solution in a tortuous flow path through said bank,
 producing relative rotation between adjacent baffles,
 circulating a heat transfer fluid through said conduit means to cool said solution in said flow path, and
 cycling a product crystal a product crystal slurry from a downstream location to an upstream location in said flow path.

14. A process as defined in claim 13 wherein said solution in said flow path contains about 45-75 percent dissolved dextrose by weight and is maintained at a temperature of about 70°-120° F., and a crystal slurry concentration of about 15-35 percent by weight is maintained in said flow path.

15. A process as defined in claim 14 wherein said solution is maintained at a concentration of dissolved dextrose up to about 10° F. supersaturation.

16. Mixing apparatus which comprises:
 a bank of spaced parallel baffles,
 closure means providing with said baffles a tortuous flow path through said bank, and
 means mounting said baffles for relative rotation between adjacent baffles,
 said baffles including rib means projecting laterally from opposite sides thereof,
 said rib means extending transversely of the direction of said relative rotation,
 said rib means projecting into close proximity to rib means of adjacent baffles, whereby said relative rotation produces alternate shearing and mixing of portions of a fluid contained between adjacent baffles, and
 said baffles having conduit means for circulating a heat transfer fluid through the baffles.

17. Mixing apparatus which comprises:
 a bank of spaced parallel baffles,
 closure means providing with said baffles a tortuous flow path through said bank, and
 means mounting said baffles for relative rotation between adjacent baffles,
 said baffles including rib means projecting laterally from opposite sides thereof,
 said rib means extending transversely of the direction of said relative rotation,
 said rib means projecting into close proximity to rib means of adjacent baffles, whereby said relative rotation produces alternate shearing and mixing of portions of a fluid contained between adjacent baffles, and
 said rib means containing conduit means for circulating a heat transfer fluid through said baffles.

18. Mixing apparatus which comprises:
 a bank of spaced parallel baffles,
 closure means providing with said baffles a tortuous flow path through said bank, and
 means mounting said baffles for relative rotation between adjacent baffles,
 said baffles including rib means projecting laterally from opposite sides thereof,
 said rib means extending transversely of the direction of said relative rotation,
 said rib means projecting into close proximity to rib means of adjacent baffles, whereby said relative rotation produces alternate shearing and mixing of portions of a fluid contained between adjacent baffles, and
 said baffles comprise vertically extending vertically coaxial cylindrical ring members, and including a horizontally extending bottom wall comprising said closure means, and means mounting alternate baffles on said wall.

19. Mixing apparatus which comprises:
 a bank of spaced parallel baffles, closure means providing with said baffles a tortuous flow path through said bank, and means mounting said baffles for relative rotation between adjacent baffles, said baffles including rib means projecting laterally from opposite sides thereof, said rib means extending transversely of the direction of said relative rotation, said rib means being corrugated with sinuous troughs and peaks when viewed in cross section lateral to their length, said rib means projecting into close proximity to rib means of adjacent baffles, whereby said relative rotation produces a alternate shearing and mixing of portions of a fluid contained between adjacent baffles, and said baffles comprise alternate disc members and annular members, and including a vertically extending shaft, means mounting said disc members on said shaft, a circular wall comprising said closure means, and means mounting said annular members on said wall.

20. Mixing apparatus which comprises:

a bank of spaced conical baffles, closure means providing with said conical baffles a tortuous flow path through said bank, and means mounting said conical baffles for relative rotation between adjacent conical baffles, said conical baffles including rib means projecting laterally from opposite sides thereof, said rib means extending transversely of the direction of said relative rotation, said rib means projecting into close proximity to rib means of adjacent conical baffles, whereby said relative rotation produces alternate shearing and mixing of portions of a fluid contained between adjacent conical baffles, and said conical baffles comprise alternate extending said conical baffles comprise alternate extending conical disc members and conical annular members, and including a vertically extending shaft, means mounting said disc members on said shaft, a circular wall comprising said closure means, and means mounting said conical annular members on said wall.

21. Mixing apparatus according to claim 20 in which the rib means are corrugated with sinuous troughs and peaks when viewed in cross section lateral to their length.

* * * * *

PO-1050
(5/69)

UNITED STATES PATENT OFFICE
CERTIFICATE OF CORRECTION

Patent No. 3,617,382                    Dated November 2, 1971

Inventor(s) Christos B. Natsis and John T. Horton

It is certified that error appears in the above-identified patent and that said Letters Patent are hereby corrected as shown below:

Col. 2, line 61, "12-13" should be --12-12--; line 64, "section" should be --sectional--. Col. 3, line 19, "in" should be --is--. Col. 4, line 34, "is" should be deleted. Col. 5, line 10, "FIG." should be --FIGS.--; line 24, "block" should be --blocks-- Col. 6, line 3, "compartment" should be --compartments--; line 21 "one" should be --One--; line 43, "lien" should be --line--; line 62, "withdrawn" should be deleted and --cycled-- inserted in place thereof. Col. 7, line 2, "adjustment" should be --adjustments--; line 14, "compartment" should be --compartments-- Col. 8, line 11, "form" should be --from--. Col. 12, about line 15, under column heading "4", beneath "53" insert --61--. Col. 14, about numbered line 12, after "cycling" delete the first occurrence of "a product crystal". Col. 16, line 12, delete the entire line which reads: "said conical baffles comprise alternate extending".

Signed and sealed this 11th day of April 1972.

(SEAL)
Attest:

EDWARD M. FLETCHER, JR.
Attesting Officer

ROBERT GOTTSCHALK
Commissioner of Patents